United States Patent
Yamrom et al.

(10) Patent No.: US 6,392,646 B1
(45) Date of Patent: May 21, 2002

(54) ITERATIVE DETERMINATION OF THE SHORTEST PATH BETWEEN TWO POINTS ON A POLYGONAL SURFACE

(75) Inventors: Boris Yamrom, Schenectady; Abdalmajeid Musa Alyassin, Niskayuna, both of NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/469,750

(22) Filed: Dec. 22, 1999

(51) Int. Cl.[7] .............................................. G06T 17/00

(52) U.S. Cl. ...................................................... 345/420

(58) Field of Search ................................ 345/418, 419, 345/420, 421, 422, 423, 424, 426

(56) References Cited

U.S. PATENT DOCUMENTS

| | | | |
|---|---|---|---|
| 4,710,876 A | 12/1987 | Cline et al. ................... | 364/414 |
| 5,113,490 A | 5/1992 | Winget ......................... | 395/119 |
| 5,410,645 A | 4/1995 | Ooka et al. ................... | 395/142 |
| 5,590,248 A | 12/1996 | Zarge et al. .................. | 395/121 |
| 5,689,577 A | 11/1997 | Arata ........................... | 382/128 |
| 5,710,578 A | 1/1998 | Beauregard et al. ......... | 345/429 |

OTHER PUBLICATIONS

JL Lancaster, D Eberly, A Alyassin, JH Downs, III, PT Fox, "A Geometric Model For Measurement Of Surface Distance, Surface Area, and Volume From Tomographic Images", Medical Physics. 19 (1992) Mar./Apr., No. 2, pp. 419–431.

European Search Report.

Primary Examiner—Cliff N. Vo
(74) Attorney, Agent, or Firm—Donald S. Ingraham; Christian G. Cabou

(57) ABSTRACT

A storage medium encoded with machine-readable computer program is used for finding the shortest path between two points on a polygonal surface. The storage medium includes instructions for causing a computer to implement a method for finding the shortest path. Given a first point and a second point on the polygonal surface, a polyline lying on the surface and passing through the two points is defined. The polyline on a polygonal mesh is analyzed to determine points lying on the polyline and on edges of the mesh. The polygonal faces of the mesh are assumed, without any loss of generality, to be triangles. If the start and end points of the polyline are not on the edges of the mesh, the faces of the polygonal surface on which the start and end points of the polyline lie are triangulated so that the start and end points become vertices of the polygonal mesh. The polyline is then modified such that it will pass through the first and second points of the polyline, creating a new polyline of a shorter length. The analysis, triangulation and modification process are repeated iteratively until a shortest possible polyline is found between the first and second points.

20 Claims, 3 Drawing Sheets

ITERATIVE DETERMINATION OF THE SHORTEST PATH BETWEEN TWO POINTS ON A POLYGONAL SURFACE

BACKGROUND OF THE INVENTION

This invention relates to a solution for the local minimum length path drawn on the surface of a polyhedron opened or closed surface.

Three-dimensional surface renderings have commonly been made using a constant triangular mesh over the surface of interest. That is, a surface of interest of a computer-generated three-dimensional image representation is selected. For example, one might use a nuclear, CT (computerized tomography) scanner, or other diagnostic imaging device to generate a three-dimensional image representation of a portion of a patient's torso surrounding the liver. Using conventional techniques, such as comparing the gray scale or CT number of each pixel in the image with a characteristic gray scale or CT number for the liver, one can identify the liver and the surface of the liver. Because all of the liver surface tissue has substantially the same gray scale or CT number, if a perspective view of the liver were re-created and displayed on a video monitor, the resultant display would have the appearance of a silhouette. There would be substantially no surface texture information conveyed.

In order to convey contour information, the surface of the liver or other structure which is visible from a viewing direction is overlaid with a constant triangular mesh. That is, the surface of the liver or other object of interest is approximated by a mesh of triangles of as uniform a size as permitted by the surface texture. In a typical 512 times 512 frame for a medical diagnostic image, one might expect to find about 20,000–50,000 triangles on the surface of interest. The vector surface normals are each compared with an illumination direction vector and a viewing direction vector. Based on the vector comparison, a gray scale (or color or hue) for each triangle is selected. Typically, the gray scales are selected to approximate the lighting and shading conditions that an object of the selected configuration would have at the corresponding point on the surface when viewed from the viewing direction and illuminated from the illumination direction.

The display may represent more than just the surface of the object. In particular, one can commonly define a cut plane on a medical diagnostic image and remove the portion of the object to one side of the cut plane. The portions of the image corresponding to the interior of the liver or other object of interest are displayed with appropriate gray scales or colors which correspond to the CT numbers or pixel values of each internal pixel of the liver or other structure that is intercepted by the slice. The remaining surface portion continues to be displayed with three-dimensional surface rendering.

Typically, the operator has the ability to rotate the displayed object. Each time the object rotates an incremental distance, the surface normals are again computed and compared with the illumination and viewing direction vectors and reassigned gray scale values to each triangle in accordance with the comparison. The large number of calculations necessary to reassign the gray scales are commonly performed slowly relative to the rotation rate of the object. That is, the operator rotates the object faster than the new gray scales can be computed, causing the object to appear to rotate in jumps, rather than smoothly. For example, if an object rotates about 5 degrees in the time necessary to recalculate the gray scale values, then the object appears to rotate in 5-degree steps.

"Decimation of Triangle Meshes" by Schroeder, et al., Computer Graphics, Vol. 26, No. 22, pgs. 65–70, July 1992, describes an algorithm which reduces the number of triangles required to model a physical or abstract object. In the Schroeder technique, multiple passes are made over an existing triangular mesh, using local geometry and topology to remove vertices that pass a distance or angle criterion. Holes left by the vertex removal are patched using a local triangulation process. One difficulty with the Schroeder technique is that it is relatively slow. Running time for the technique is on the order of minutes. Commonly, radiologists expect to review CT, nuclear camera and magnetic resonance images substantially in real time and do not find waiting on the order of minutes acceptable. Arata U.S. Pat. No. 5,689,577, issued Nov. 18, 1997, teaches an improved three-dimensional triangle mesh simplification technique which overcomes the above referenced problems.

A common problem in computational science is the need to represent the geometry of an object or the structure of data. One method for representing such objects is to use a polygonal mesh. A system and method that generates a large polygonal mesh is described in Cline et al. U.S. Pat. No. 4,710,876, issued Dec. 1, 1987, and assigned to the instant assignee. Other techniques, such as automatic mesh generation or terrain mapping from satellite data, are also capable of generating large polygonal meshes. For example, the complex, curved surface of a human tooth can be approximated by using many thousands of triangles (or other polygon types) joined along their common edges. The ability to represent geometry is important for many reasons. In computer graphics, polygonal meshes are used in the lighting and shading operations to generate images. Polygonal meshes are used in numerical analyses to represent the boundary of solid objects. From these representations, equations can be developed to solve such complex problems as heat flow, structural response, or electromagnetic propagation. Another application is in geometric modeling, where polygonal meshes are often used to determine object mass, volume, surface area, center of gravity, and moments of inertia.

In the past, polygonal meshes were typically comprised of hundreds to thousands of polygons, and computer hardware and software has been designed to process the volumes of information obtainable therefrom. However, recent advances in computational science have resulted in techniques that generate hundreds of thousands or even millions of polygons. Such large numbers, while capturing the geometry of the object very precisely, often overwhelm computer systems. For example, most graphics systems presently are incapable of rendering a million polygons at a speed that is not detrimental to interactive computation.

The basic problem is that techniques that generate large polygonal meshes are extremely valuable and cannot be easily modified to produce fewer polygons. Hence a general technique for reducing, or decimating, a mesh composed of a large number of polygons to one containing fewer polygons is necessary. Furthermore, the decimation process, to be effective, must preserve the topological and shape properties of the original polygonal mesh.

Zarge et al. U.S. Pat. No. 5,590,248 (the '248 patent), issued Dec. 31, 1996 and assigned to the instant assignee, teaches a method for reducing the complexity of a polygonal mesh while preserving the topological properties and shape of the original mesh. By this method, each vertex in the mesh is analyzed to determine if it is superfluous and is removed along with all of the triangles connected to it if it is superfluous. The polygon created by removing a vertex is filled (retriangulated) with new triangles according to an algorithm disclosed herein. The method further includes the step of removing triangles (consolidation) from the mesh if the triangles are relatively small compared to neighboring triangles. The method also includes removal of edges from the mesh if those edges are relatively short as compared with neighboring edges.

The '248 patent is implemented as a computer programmed to perform the method steps disclosed. The program allows a user to specify various thresholds therein disclosed to control the representational accuracy of the resulting mesh. The program may also be run in an iterative fashion until a desired reduction in mesh complexity has been achieved.

The aforementioned U.S. Pat. No. 4,710,876 (the '876 patent) is generally directed to a system and method for displaying surface information. The images of the surfaces displayed are typically contained within the interior regions of solid bodies which are examined by computed tomography (CT) x-ray systems or by magnetic resonance (MR) imaging systems, either of which is capable of generating three dimensional arrays of data representative of one or more physical properties at various locations within a three dimensional volume. More particularly, the '876 patent is directed to a system and method for the display of medical images so as to obtain images and representations of internal bodily structures. The images generated in the practice of the '876 patent provide three-dimensional data for examination by physicians, radiologists, and other medical practitioners.

In conventional x-ray systems, a two-dimensional shadow image is created based upon the different x-ray absorption characteristics of bone and soft tissues. A great improvement on the conventional x-ray system as a diagnostic tool has been provided by CT systems which are x-ray based and initially were used to produce single two-dimensional views depicting transverse slices of a body, object, or patient being examined. Three dimensional information was thereafter gleaned from CT scan data by generating data for a number of contiguous slices and using the inferential abilities of the radiologist to suggest a three dimensional representation for the various internal organs. In one embodiment of the '876 patent, shaded and contoured three-dimensional images are generated from the three-dimensional array of data generated by a sequence of such contiguous CT scans. In the same way, the newer MR imaging technology is also capable of generating three-dimensional arrays of data representing physical properties of interior bodily organs.

Moreover, MR systems have the capability to better discriminate between various tissue types, not just between bone and soft tissue. MR imaging systems are also capable of generating physiological data as well as image data. However, whether MR or CT systems are employed, the data have been made available only as a sequence of slices, and systems have not generally been available for providing true three-dimensional images.

The '876 patent describes three-dimensional data generated either by a CT scanning system or by an MR imaging system, which may be displayed and analyzed in a plurality of ways so as to produce on a display screen or other device a multitude of anatomical features that are selectable at the viewer's choice. In a preferred embodiment of the invention, the data used to produce the three dimensional images are typically acquired once and then used and re-used to generate medical information and display images at the option of the viewer. The viewer is provided with the option of selecting one or more threshold values which determine, for example, whether or not bone surfaces as opposed to brain surface tissue is to be displayed. The viewer or operator of the present system can also select the appropriate viewing angle and, can at will, selectively ignore segments of the data generated in order to provide cross sectional views through any desired plane.

Because the viewing angle is selectable, it is possible to generate a sequence of images and display them sequentially to provide the medical practitioner with interior views of solid surfaces in a truly three dimensional manner from any desired viewing angle, with the further capability of being able to-construct a view through any plane or slice. While for many purposes, an almost infinite variety of meaningful images may be created from only a single set of MR or CT scan slice data array, if the objective of the medical investigation is the study of internal anatomic variations as a function of time, then it is meaningful to produce a sequence of three dimensional data arrays indexed by time. The system and method of the present invention provide the medical practitioner, and surgeons in particular, with ability to plan detailed and complicated surgical procedures using totally non-invasive diagnostic methods. The dramatic images generated by the invention show every evidence of being as great an improvement in the medical imaging arts as computed axial tomography and nuclear magnetic resonance imaging.

While the system and method of the '876 patent finds its greatest utilization in analysis and display of CT and MR imaging data, the present invention is equally applicable to systems employing ultrasound, positron emission tomography, ECT (emission computed tomography) and MMI (multimodality imaging). Moreover, while particularly applicable to the construction of medical images, the invention is also applicable to the display of interior three dimensional surface structures for any system capable of generating three dimensional data arrays in which signal patterns representing the value of at least one physical property associated with points in a solid body are present.

A particular advantage of the invention is its capability to provide the medical practitioner with ability to interact with the system apparatus in real time. Systems which do not permit interactive use suffer a significant disadvantage since a real time display methodology is required for optimal human interaction with the system, particularly for a surgeon planning a difficult procedure. For example, in transplant surgery, it is often difficult to ascertain beforehand the precise shape or size of a body cavity which is to receive the implant. This is true whether or not the implant comprises human tissue or a mechanical device. It therefore would be important for a surgeon to be able to display the cavity in three dimensional form and to rotate and section the cavity image at will, before undertaking any invasive procedure. It is also important that the images generated be sharp and exhibit excellent contrast. The images generated should also depict surface texture wherever possible.

Display of three-dimensional graphic images on a cathode ray tube (CRT) screen has principally been driven by the goals and directions of computer aided design (CAD) and computer aided manufacture (CAM). Systems have been developed for displaying solid bodies and for manipulating images in desirable fashion to create solid models for manufactured parts and for rotating and viewing these parts from a multiplicity of directions. In particular, CAD/CAM systems have been developed which accept so called wireframe data. In a wire-frame display format, the display processor is provided with a sequence or list of three-dimensional points representative of the end points of line segments. These line segments are joined to represent various surfaces. An advantage of these wire frame images is the ability to rapidly rotate the image about various axes to obtain different views. This is a computationally burdensome task which has recently been alleviated through utilization of high speed, large-scale integrated circuit devices.

A wire-frame image, even one which has been processed to eliminate hidden lines, may typically comprise a list of 50,000 vectors which is displayed on a screen, each "vector" being a (directed) line segment drawn between two points on a CRT form of display device. More sophisticated graphics processing systems not only accept wire-frame data, but also perform functions such as hidden line removal and continuous shading in various colors and/or shades of gray. In such systems, the viewing angle is selected by the operator. In systems displaying shaded images, the normal vector to the surface being displayed varies from point to point on the surface and the shading is determined from this normal vector and the viewing angle. Thus the information provided by the normal vector is critically important in applying the shading to what is in actuality a two dimensional CRT screen image. It is the shading of this image (based originally on wire-frame data) that creates the illusion of three dimensions. Providing these three dimensional clues (shading) to the human visual system is achieved particularly well by the present invention. The shading data are generally produced from wire-frame data in a graphics processing system which converts the vector format of wireframe images to the so-called raster scan format that is commonly used in displaying television images.

Accordingly, there is a need for improving the computation and display of three-dimensional information. One of the computational goals is to use a method for finding the shortest path between two points on a polygonal surface. Such method would be useful in conjunction with CT scanners, ultrasound devices, MR imaging systems, and other systems capable of generating three dimensional data representative of one or more physical properties within a body to be studied. These techniques also have application in graphics systems for medical images, which are capable of interactive use and, at the same time, produce high quality images that provide textural, shading, and other visual clues to the user. Such graphics systems provide medical practitioners with the ability to emulate surgical procedures graphically prior to undertaking invasive measures.

SUMMARY OF THE INVENTION

In a preferred embodiment of the invention, the shortest path is found between first and second points through which is passed a polyline lying on a polygonal surface. The polyline is a one-dimensional cell consisting of one or more connected lines, and is defined by an ordered list of n+1 points, where n is the number of lines in the polyline and each pair of points (i, i+1) defines a line. The polyline is analyzed on a polygonal mesh defining the surface to determine points lying on the polyline and on edges of the mesh. The polygonal faces of the mesh are assumed, without any loss of generality, to be triangles. If the start and end points of the polyline are not on the edges of the mesh, the faces of the polygonal surface on which the start and end points of the polyline lie are triangulated so that the start and end points become vertices of the polygonal mesh. The polyline is then modified such that it will pass through the first and second points of the polyline, creating a new polyline of shorter length. This process of analysis, triangulation and modification is iterative and is continued until a shortest possible polyline is found between the first and second points. This shortest polyline may be used, for example, to define a planar cut of the surface going through the two points between which the shortest path has been determined.

Finding the shortest path on a non-flat surface is a requirement encountered in numerous practical applications, e.g., building the shortest road connecting two locations in a mountainous region, or flying the shortest route between two locations in a mountainous region while maintaining constant elevation above the ground (typical for helicopter military missions). In the first example there may be other criteria apart from the road length, such as maximum incline of the road and water crossings that may require some modification to the presented method while, in the second example the method is applicable without any modification. In both examples, solution is possible due to the availability of digital elevation maps that provide polygonal representation of the earth surface.

Another application is to find the minimal distance between two points on the surface of the brain (the cortex) as extracted from an MR data set. This distance is of use to researchers studying physiological information obtained, for instance, from functional MR data. The pure straight-line distance is not as useful as the shortest path along the surface since the distance along the surface can be related to physiological activity in the brain.

DETAILED DESCRIPTION OF INVENTION

Given two points on a surface, it is necessary to define a polyline P lying on the surface and passing through these two points and, for example, defining a planar cut of the surface passing through these two points.

Figure 1:
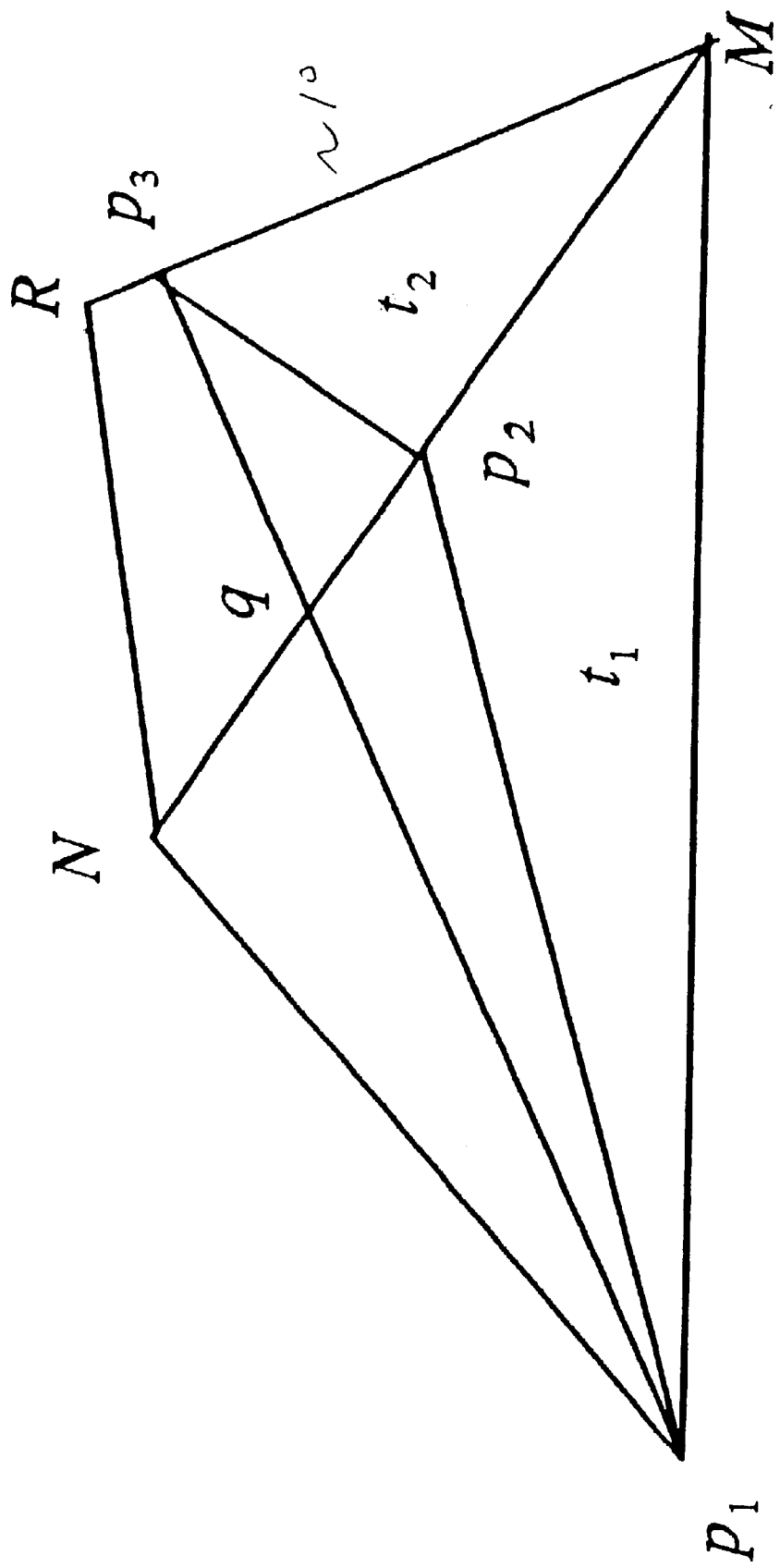
FIG. 1 is a diagram illustrating the three adjacent points of a polyline.

FIG. 1 illustrates a polyline lying on a polygonal surface 10 and passing through the two points. Thus, $(p_1, p_2 \ldots, p_{n1})$ is a polyline defined as $P_1$, with vertices $(p_1, p_2 \ldots, p_{n1})$ all lying on the surface and, with the possible exception of the first and last points, also lying on the edges of a polygonal mesh defining the surface. It is assumed, without loss of generality, that all polygonal faces of the mesh are triangles. If the first and last points of the polyline are not on the edges of the polygonal mesh, the faces on which they lie can be triangulated so that the start and the end points of the polyline become vertices of the polygonal mesh. L(P) is denoted the length of polyline P.

Designating the first point of the polyline as A and the last point of the polyline as B, the polyline is modified such that it will pass through points A and B and have the locally shortest length (become a geodesic on the surface). This modification is an iterative process that starts with the first three points of the polyline and creates a new polyline with a shorter length that has point $p_2$ replaced by a set of points $q_1, q_2, \ldots, q_k$. This process is described in detail below.

The new polyline is $P_2=(p_1^2, p_2^2, \ldots, p_{n2}^2)$ meeting the conditions:

$$A=p_1^2, B=p_{n2}^2, L(P_2)<L(P_1)$$

The process is repeated for points $p_1^2, p_2^2, p_3^2$, resulting in a new polyline $P_3=(p_1^3, p_2^3, \ldots, p_{n3}^3)$ meeting the condition:

$$A=p_1^3, B=p_{n3}^3, L(P_3)<L(P_2).$$

Eventually, the situation is reached in which the second point in the polyline will not move/split. The process proceeds to the second, third and fourth points of the extant polyline and repeats the optimization until the second point (the third if counting from the beginning) stops moving/splitting. These iterations are continued to the last triple of points. After that the process starts again with the first triple of points, etc. The iteration process generates a sequence of polylines $P_1, P_2, \ldots$ that start and end at A and B and satisfy the conditions:

$$L(P_1)>L(P_2)>L(P_3)>$$

The process stops when it is not possible to move/split the second point after finishing the last triple. At this time the process has found the polyline with the locally shortest length that connect points A and B and lies on the surface.

Figure 2:
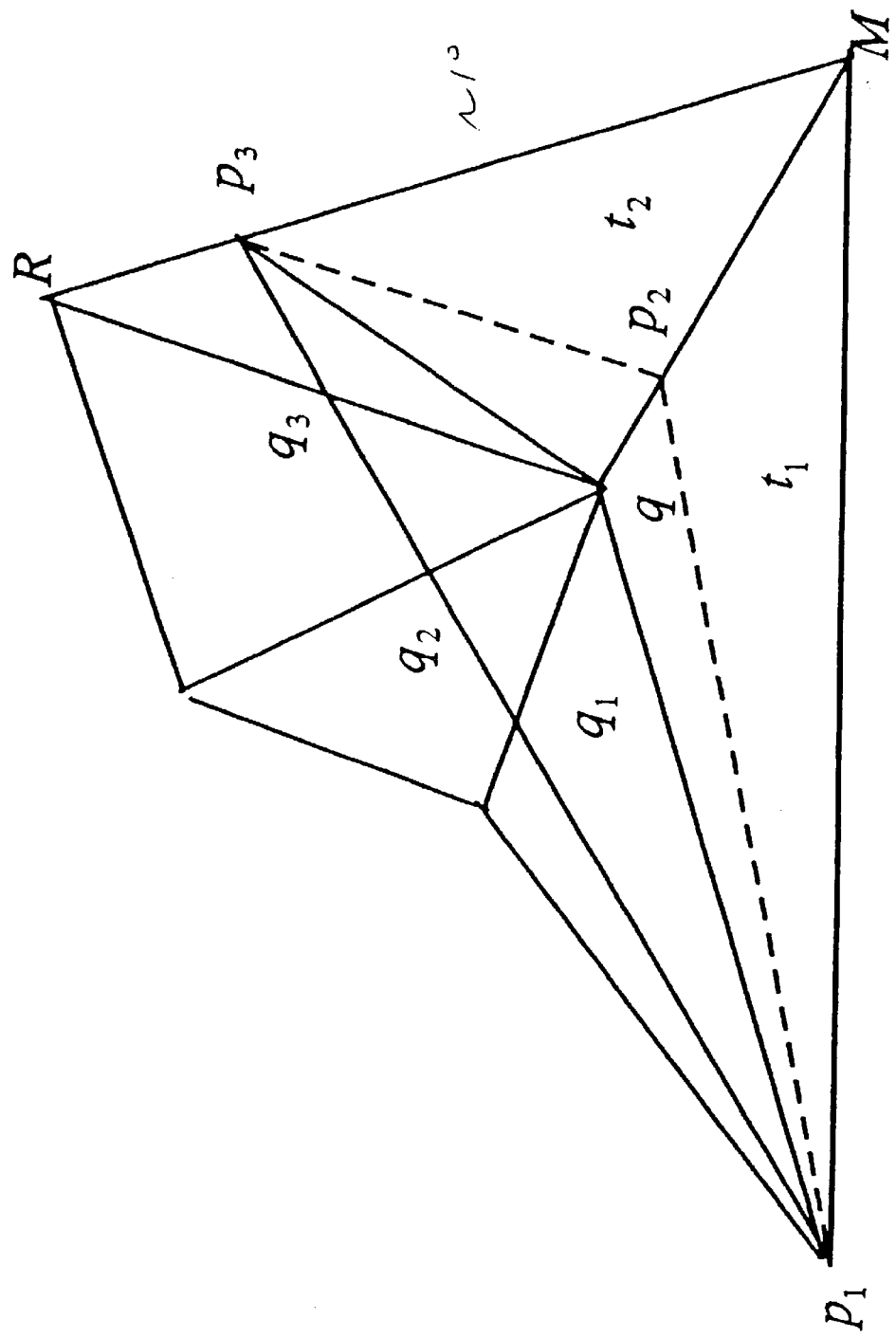
FIG. 2 is a diagram illustrating a point intersection between a line and a common edge.

The move/split procedure can be understood by considering three adjacent points of the polyline $p_1, p_2, p_3$ shown in FIG. 1. Point $p_1=A$ is a vertex of triangle $t_1=p_1NM$ and point $p_2$ is on the edge of triangle $t_2=NRM$. While points A and B are at vertices of the triangles, all other points are on the edges/vertices of the triangles. Triangle $t_2$ is rotated around its edge to align it with the plane of triangle $t_1$. The shortest path between points $p_1$ and $p_3$ is a straight line connecting these two points in the plane, and q is a point of intersection of this line and the common edge. Then $L(p_1, q, p_3)<L(p_1, p_2, p_3)$. If q is inside the edge, the process stops. Otherwise, it is necessary to consider what happens when point q moves to the end vertex of the edge and beyond, as shown in FIG. 2.

Figure 3:
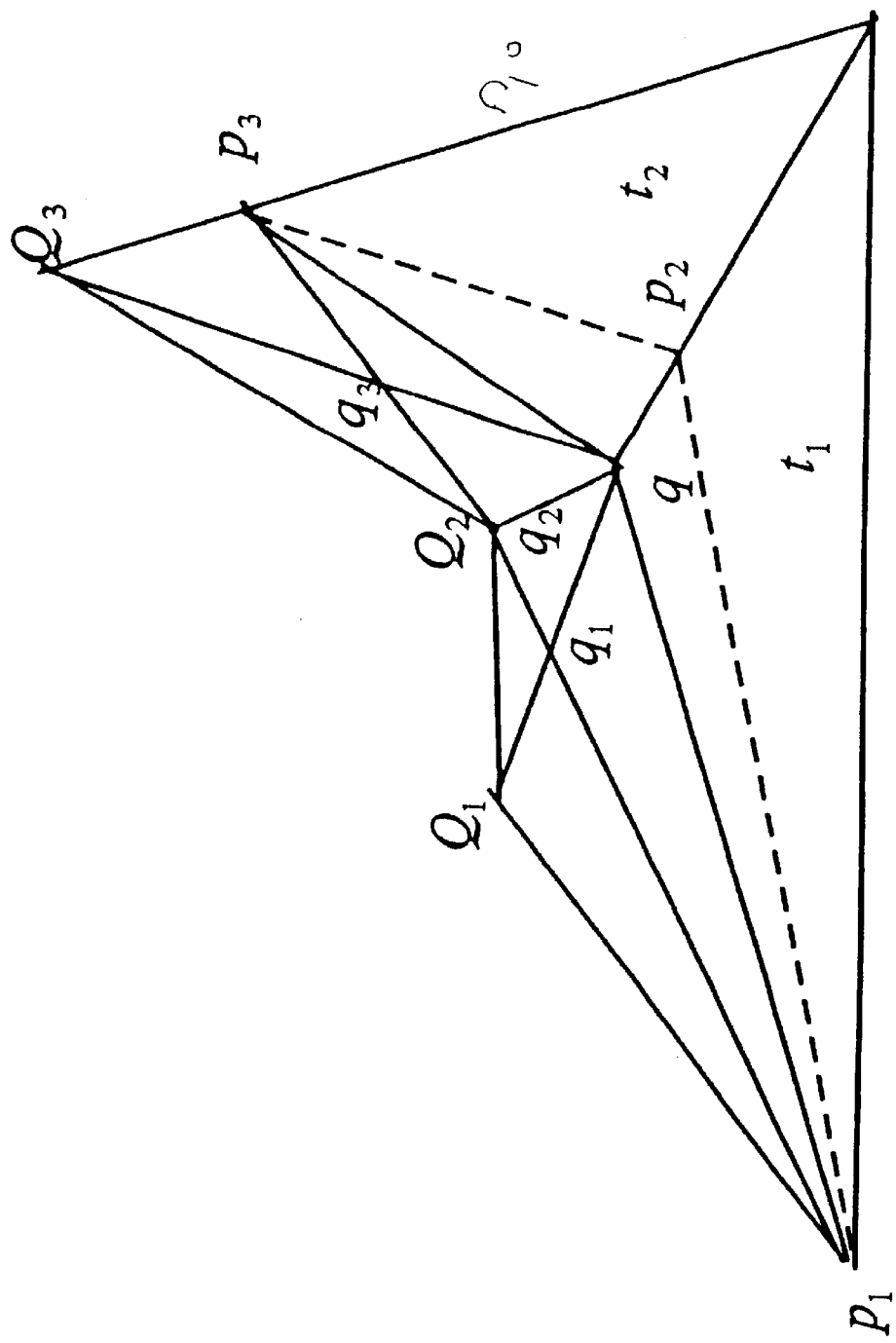
FIG. 3 is a diagram illustrating the shortest polyline.

For q at the end point of the edge the inequality still holds, but the process determines if the path can be shortened even more by moving the point beyond the vertex. The planar angle $\angle p_1qp_3$ is less than $\pi$, otherwise point q would not be the end point of the edge common to triangles $t_1=p_1qM$ and $t_2=qRM$. If all triangles of the mesh sharing the vertex q and connecting triangles $t_1$ and $t_2$ are flattened on the plane together with $t_1$ and $t_2$, a new angle $\angle p_1qp_3$ is obtained. The angle value may be different though the same lines $p_1q$ and $qp_3$ are used for angle definition. The lines may move after flattening all triangles around vertex q. If this angle is greater then $\pi$ the process stops here. Otherwise the process can split point q into several points, one for each of the edges of the triangles that share q. The process results in a polyline $p_1, q_1, \ldots, q_k, p_3$ while, if there is just one triangle between $t_1$ and $t_2$, and $p_3$ is a vertex, then k may be 0. The shortest polyline that connects points $p_1$ and $p_3$ and lies inside all these triangles is part of a convex hull of points $p_1, Q_1, \ldots, Q_k, p_3$, where points $Q_1, \ldots, Q_k$ are ends of edges emanating from vertex q as shown in FIG. 3.

The polyline obtained through this process satisfies the condition $L(p_1, q_1, \ldots, q_k, p_3)<L(p_1, p_2, p_3)$ and the process creates a polyline $P_2=(p_1^2, \ldots, p_{n2}^2)=(p_1, q_1, \ldots, q_k, p_3, \ldots, p_{n1})$ for which the condition $L(P_2)<L(P_1)$ holds.

Because this process makes use of polylines, the memory capacity required for storing the points through which the polyline passes is greatly reduced from that which would be needed if polylines were not employed. As a result, the process runs faster and the costs associated with implementing the process are reduced. The process may be implemented in a computer graphics system including a graphics support library or in any computational tool evaluating surfaces within a three-dimensional display system. Such computational tools may be included in medical modalities such as magnetic resonance, CT or X-ray equipment. In addition, the method may be used in situations where a polygonal surface is used as a polygonal representation of industrial CAD systems.

While the invention can be embodied in the form of computer-implemented processes and apparatuses for practicing those processes, it can also be embodied in the form of computer program code containing instructions recorded in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for finding the shortest path between two points on a polygonal surface comprising:
    establishing a polyline lying on said surface and passing through a first point and second point on said surface;
    analyzing said polyline on a polygonal mesh defining said surface to determine points lying on said polyline and on edges of said mesh, said mesh having polygonal faces in the form of triangles;
    modifying said polyline such to pass through said first and second points of said polyline and thereby create a new polyline of shorter length than said first polyline; and
    repeating the analysis, triangulation and modification iteratively until a shortest possible polyline is found between said first and second points.

2. The method of claim 1 wherein start and end points of said polyline lie on other than an edge of said polygonal mesh and including, prior to modifying said polyline:
    triangulating faces of said polygonal surface upon which said start and end points of said polyline lie to become vertices of said polygonal mesh.

3. The method of claim 1 wherein one of said start and end points of said polyline lies on other than an edge of said polygonal mesh and including, prior to modifying said polyline:
    triangulating a face of said polygonal surface upon which said one of the start and end points of said polyline lies to become a vertex of said polygonal mesh.

4. The method of claim 1 wherein said polygonal surface is a polygonal representation of one of the group consisting of earth's surface, a computer graphics display, and industrial CAD parts.

5. The method of claim 1 wherein said polygonal surface is a polygonal representation of a human body part extracted from a medical modality data set from one of the group consisting of magnetic resonance, computerized tomography, and X-ray.

6. A storage medium encoded with a machine-readable computer program for finding the shortest path between two points on a polygonal surface, the storage medium including instructions for causing a computer to implement a method comprising:

establishing a polyline lying on said surface and passing through a first point and a second point on said surface;

analyzing said polyline on a polygonal mesh defining said surface to determine points lying on said polyline and on edges of said mesh, said mesh having polygonal faces in the form of triangles;

modifying said polyline to pass through said first and second points of said polyline and thereby create a new polyline of shorter length than said first polyline; and repeating the analysis, triangulation and modification iteratively until a shortest possible polyline is found between said first and second points.

7. The storage medium of claim 6 wherein start and end points of said polyline lie on other than an edge of said polygonal mesh and including, prior to modifying said polyline:

triangulating faces of said polygonal surface upon which said start and end points of said polyline lie to become vertices of said polygonal mesh.

8. The storage medium of claim 6 wherein one of said start and end points of said polyline lies on other than an edge of said polygonal mesh and including, prior to modifying said polyline:

triangulating a face of said polygonal surface upon which said one of the start and end points of said polyline lies to become a vertex of said polygonal mesh.

9. The storage medium of claim 4 wherein the polygonal surface is a polygonal representation of one of the group consisting of earth's surface, a computer graphics display, and industrial CAD parts.

10. The storage medium of claim 6 wherein said polygonal surface is a polygonal representation of a human body part extracted from a medical modality data set from one of the group consisting of magnetic resonance, computerized tomography, and X-ray.

11. A computer program for use with a graphics display device, said computer program comprising:

a computer usable medium capable of having computer readable program code means embodied in said medium for finding the shortest path between two points on a polygonal surface; and computer readable program code embedded in said medium and adapted to operate a computer to perform the steps of:

establishing a polyline lying on said surface and passing through a first point and a second point on said surface;

establishing a polyline lying on said surface and passing through a first point and a second point on said surface;

analyzing said polyline on a polygonal mesh defining said surface to determine points lying on said polyline and on edges of said mesh, said mesh having polygonal faces in the form of triangles;

modifying said polyline to pass through said first and second points of said polyline and thereby create a new polyline of shorter length than said first polyline; and repeating the analysis, triangulation and modification iteratively until a shortest possible polyline is found between said first and second points.

12. The computer program of claim 11 wherein start and end points of said polyline lie on other than an edge of said polygonal mesh and including, prior to the step of modifying said polyline:

triangulating faces of said polygonal surface upon which said start and end points of said polyline lie to become vertices of said polygonal mesh.

13. The computer program of claim 11 wherein one of said start and end points of said polyline lies on other than on edge of said polygonal mesh and including, prior to the step of modifying said polyline:

triangulating a face of said polygonal surface upon which said one of the start and end points of said polyline lies to become a vertex of said polygonal mesh.

14. The computer program of claim 11 wherein the polygonal surface is a polygonal representation of one of the group consisting of earth's surface, an image upon said computer graphics display, and industrial CAD parts.

15. The computer program of claim 11 wherein said polygonal surface is a polygonal representation of a human body part extracted from a medical modality data set from one of the group consisting of magnetic resonance, computerized tomography, and X-ray.

16. An article of manufacture for use in a computer having an operating system and a graphics support library for finding, or a graphics display, the shortest path between two points on a polygonal surface, said article of manufacture comprising a storage medium having computer readable program code embedded therein, said program code being adapted to operate said computer to perform the steps of:

establishing a polyline lying on said surface and passing through a first point and a second point on said surface;

analyzing said polyline on a polygonal mesh defining said surface to determine points lying on said polyline and edges of said mesh, said mesh having polygonal faces in the form of triangles;

modifying said polyline to pass through said first and second points of said polyline and thereby create a new polyline of shorter length than said first polyline; and repeating the analysis, triangulation and modification iteratively until a shortest possible polyline is found between said first and second points.

17. The article of manufacture of claim 16 wherein start and end points of said polyline lie on other than an edge of said polygonal mesh and including, prior to the step of modifying said polyline:

triangulating faces of said polygonal surface upon which start and end points of said polyline lie to become vertices of said polygonal mesh.

18. The article of manufacture of claim 16 wherein said one of said start and end points of said polyline lies on other than an edge of said polygonal mesh and including, prior to the step of modifying said polyline:

triangulating a face of said polygonal surface upon which said one of the start and end points of said polyline lies to become a vertex of said polygonal mesh.

19. The article of manufacture of claim 16 wherein the polygonal surface is a polygonal representation of one of the group consisting of earth's surface, said computer display, and industrial CAD parts.

20. The article of manufacture of claim 16 wherein said polygonal surface is a polygonal representation of a human body part extracted from a medical modality data set from one of the group consisting of magnetic resonance, computerized tomography, and X-ray.

* * * * *